(12) United States Patent
Kwon et al.

(10) Patent No.: US 8,203,834 B2
(45) Date of Patent: Jun. 19, 2012

(54) FLAT PANEL DISPLAY APPARATUS (75) Inventors: Oh-June Kwon, Suwon-si (KR);
Seung-Yong Song, Suwon-si (KR);
Kwan-Hee Lee, Suwon-si (KR);
Young-Seo Choi, Suwon-si (KR);
Sun-Young Jung, Suwon-si (KR);
Ji-Hun Ryu, Suwon-si (KR);
Young-Cheol Joo, Suwon-si (KR);
Jung-Jun Im, Suwon-si (KR); Dong-Su Yee, Suwon-si (KR); Chan-Hee Wang, Suwon-si (KR); Chan-Kyoung Moon, Suwon-si (KR); Jang-Hwan Shin, Suwon-si (KR); Dae-Ho Lim, Suwon-si (KR); Rog Hur, Suwon-si (KR);
Kuen-Dong Ha, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 395 days.

(21) Appl. No.: 12/320,002

(22) Filed: Jan. 14, 2009

(65) Prior Publication Data
US 2009/0185339 A1   Jul. 23, 2009

(30) Foreign Application Priority Data
Jan. 21, 2008   (KR) .................. 10-2008-0006224

(51) Int. Cl.
G06F 1/16   (2006.01)
(52) U.S. Cl. ......... 361/679.21; 361/679.26; 361/679.55; 349/56; 349/58; 349/60
(58) Field of Classification Search ............. 361/679.21; 349/48
See application file for complete search history.

(56) References Cited

U.S. PATENT DOCUMENTS

| 6,309,902 | B1 * | 10/2001 | Muramatsu | 438/30 |
| 7,256,856 | B2 * | 8/2007 | Imaeda | 349/145 |
| 7,586,744 | B2 * | 9/2009 | Okuda | 361/679.56 |
| 7,646,466 | B2 * | 1/2010 | Hashimoto | 349/158 |
| 2006/0133018 | A1 * | 6/2006 | Okuda | 361/681 |
| 2008/0088765 | A1 * | 4/2008 | Hashimoto | 349/58 |
| 2008/0094561 | A1 * | 4/2008 | Fan et al. | 349/151 |
| 2008/0158467 | A1 * | 7/2008 | Tseng et al. | 349/58 |

(Continued)

FOREIGN PATENT DOCUMENTS
JP   09-061795 A   3/1997
(Continued)

OTHER PUBLICATIONS

Japanese Office Action in JP 2009-004940, dated Jun. 28, 2011 (Kwon, et al.).

Primary Examiner — Anthony Q Edwards
(74) Attorney, Agent, or Firm — Lee & Morse, P.C.

(57) ABSTRACT

A flat panel display apparatus includes a flat display panel including first and second substrates facing each other with a display unit therebetween, the first substrate extending beyond the second substrate, a portion of the first substrate extending beyond the second substrate defining a protruding portion, an outermost edge of the protruding portion defining a protruding edge of the first substrate, and corners of the protruding portion being chamfered, and a bezel surrounding the flat display panel.

9 Claims, 9 Drawing Sheets

U.S. PATENT DOCUMENTS

| | | | |
|---|---|---|---|
| 2009/0027839 A1* | 1/2009 | Miyata | 361/679.21 |
| 2009/0115942 A1* | 5/2009 | Watanabe | 349/96 |
| 2009/0257189 A1* | 10/2009 | Wang et al. | 361/679.56 |

FOREIGN PATENT DOCUMENTS

| | | |
|---|---|---|
| JP | 9-105917 A | 4/1997 |
| JP | 2001-042303 | 2/2001 |
| JP | 2003-308023 | 10/2003 |
| JP | 2004-151551 A | 5/2004 |
| JP | 2006-039473 A | 2/2006 |
| JP | 2007-065532 | 3/2007 |
| KR | 10-2001-0082826 A | 8/2001 |
| KR | 10-2004-0000202 A | 1/2004 |
| KR | 10-2007-0064103 A | 6/2007 |

* cited by examiner

FLAT PANEL DISPLAY APPARATUS

BACKGROUND OF THE INVENTION

1. Field of the Invention

Embodiments of the present invention relate to a flat panel display apparatus. More particularly, embodiments of the present invention relate to a flat panel display apparatus having a structure capable of reducing damage resulting from dropping or the like.

2. Description of the Related Art

In general, a flat panel display apparatus may include a flat display panel and a bezel. For example, a conventional flat panel display apparatus may be mounted on a mobile device or may be stationary.

When an external impact is applied to the conventional flat panel display apparatus, however, the flat display panel may be damaged. For example, when the conventional flat panel display apparatus is dropped, e.g., during handling and/or manufacturing, the bezel may be bent, thereby exerting force on the flat display panel and damaging it. A damaged flat display panel may have reduced operability.

SUMMARY OF THE INVENTION

Embodiments of the present invention are therefore directed to a a flat panel display apparatus, which substantially overcomes one or more of the disadvantages and shortcomings of the related art.

It is therefore a feature of an embodiment of the present invention to provide flat panel display apparatus with a flat display panel having a substrate structure capable of reducing damage due to external impact.

At least one of the above and other features and advantages of the present invention may be realized by providing a flat panel display apparatus, including a flat display panel, the flat display panel having first and second substrates facing each other, the first substrate extending beyond the second substrate, a portion of the first substrate extending beyond the second substrate defining a protruding portion, an outermost edge of the protruding portion defining a protruding edge of the first substrate, and corners of the protruding portion being chamfered, and a display unit between the first and second substrates, and a bezel surrounding the flat display panel. The bezel may surround the first substrate. The chamfered corners of the protruding portion may be facing corners of the bezel.

The bezel may include at least three side panels extending along three edges of the first substrate, the three edges of the first substrate being other than the protruding edge of the first substrate. The bezel may include three side panels and one partial side panel along edges of the first substrate, the partial side panel extending along the protruding edge of the protruding portion and the three side panels extending along three edges of the first substrate other than the protruding edge of the first substrate, and the partial side panel being perpendicular to two of the three side panels. A space may be defined between a chamfered corner of the protruded portion and a respective corner of the bezel, the respective corner of the bezel being defined by one side panel and a portion of the partial side panel. A portion of the partial side panel may be in direct contact with a side panel of the three side panels and may overlap only a portion of the protruding edge of the first substrate, the protruding edge of the first substrate being defined as a surface between the chamfered corners.

The flat panel display apparatus may further include a terminal unit on the protruding portion of the first substrate, the terminal unit being electrically connected to the display unit. The flat panel display apparatus may further include a flexible printed circuit board electrically connected to the terminal unit. The bezel may include an elastic material. The elastic material may include metal. The chamfered corners of the protruding portion may be substantially planar. The chamfered corners may be curved. The chamfered corners of the protruding portion may be convex. The chamfered corners of the protruding portion may be concave.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Korean Patent Application No. 10-2008-0006224, filed on Jan. 21, 2008, in the Korean Intellectual Property Office, and entitled: "Flat Panel Display Apparatus," is incorporated by reference herein in its entirety.

Exemplary embodiments of the present invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of elements, layers, and regions may be exaggerated for clarity of illustration. It will also be understood that when an element and/or layer is referred to as being "on" another element, layer and/or substrate, it can be directly on the other element, layer, and/or substrate, or intervening elements and/or layers may also be present. Further, it will be understood that the term "on" can indicate solely a vertical arrangement of one element and/or layer with respect to another element and/or layer, and may not indicate a vertical orientation, e.g., a horizontal orientation. In addition, it will also be understood that when an element and/or layer is referred to as being "between" two elements and/or layers, it can be the only element and/or layer between the two elements and/or layers, or one or more intervening elements and/or layers may also be present. Further, it will be understood that when an element and/or layer is referred to as being "connected to" or "coupled to" another element and/or layer, it can be directly connected or coupled to the other element and/or layer, or intervening elements and/or layers may be present. Like reference numerals refer to like elements throughout.

Figure 1A:
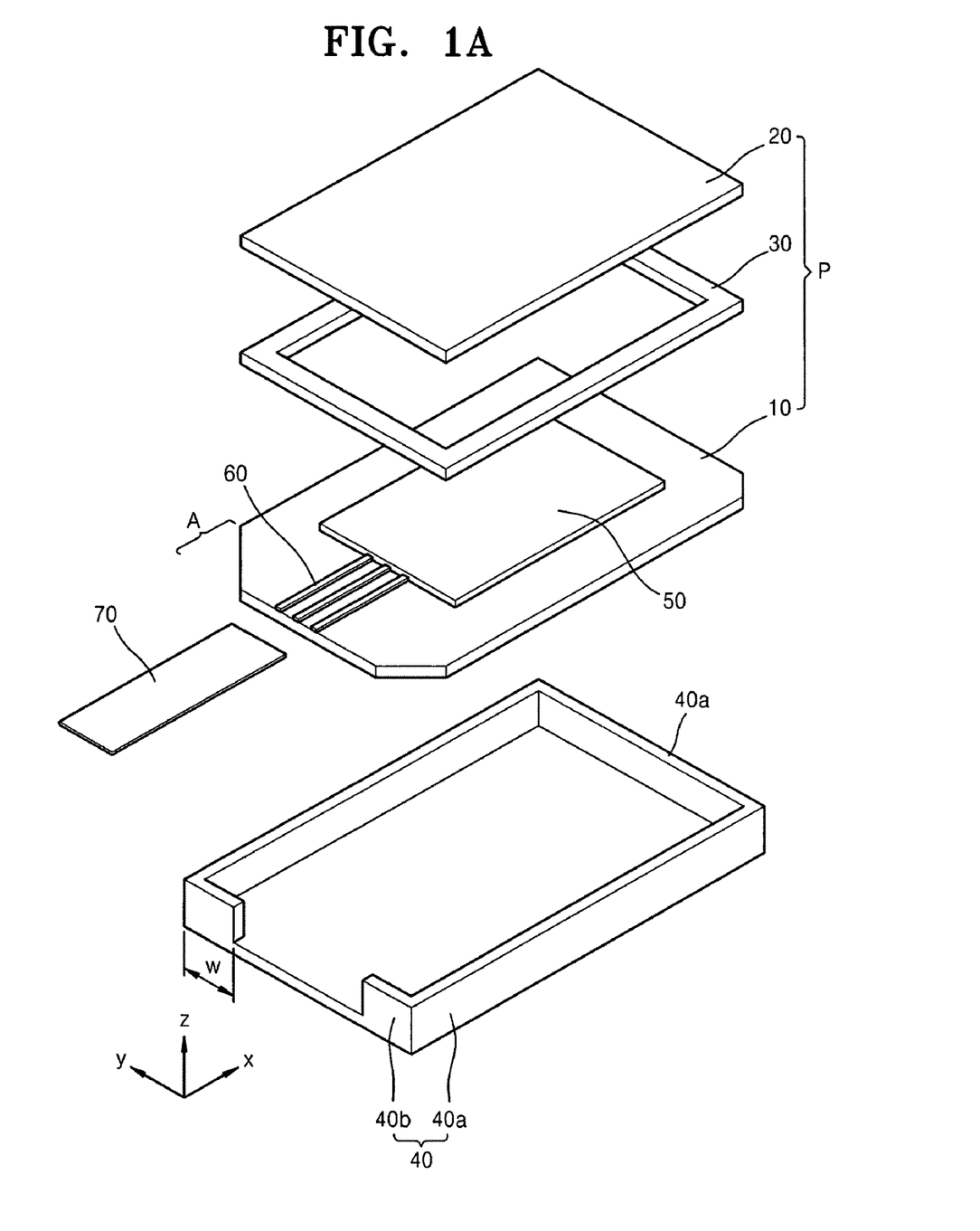
FIG. 1A illustrates an exploded perspective view of a flat panel display apparatus according to an embodiment of the present invention.
Figure 1B:
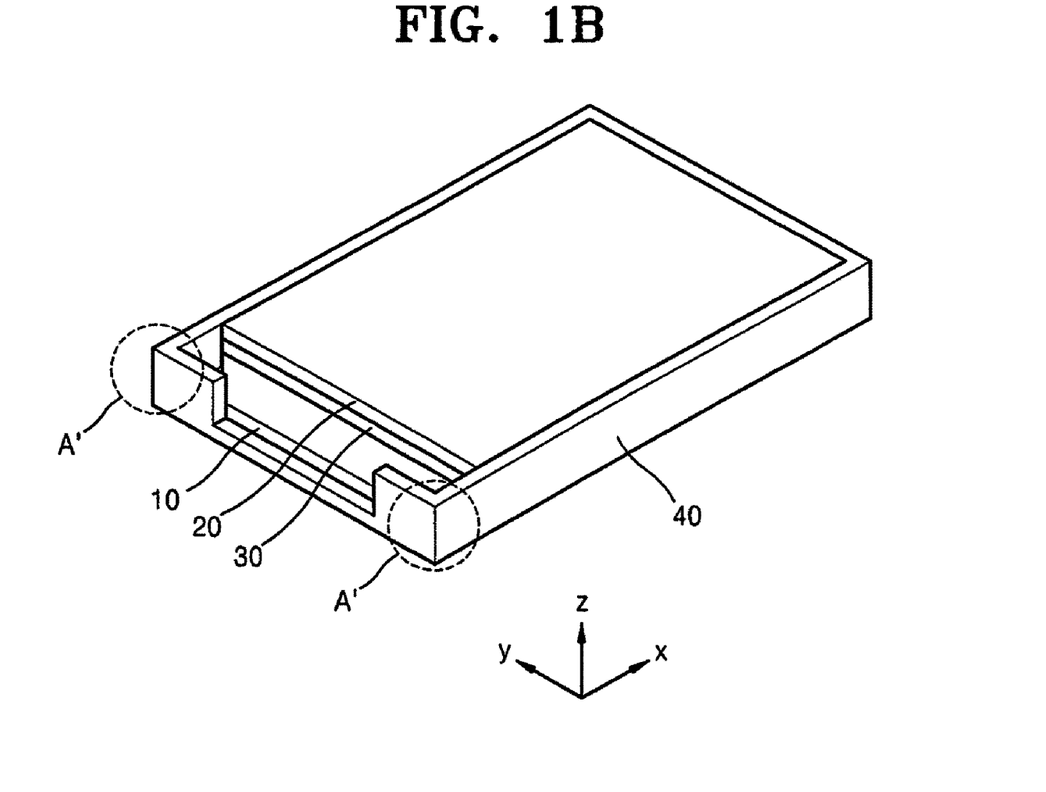
FIG. 1B illustrates an assembled perspective view of the flat panel display apparatus of FIG. 1A.
Figure 1C:
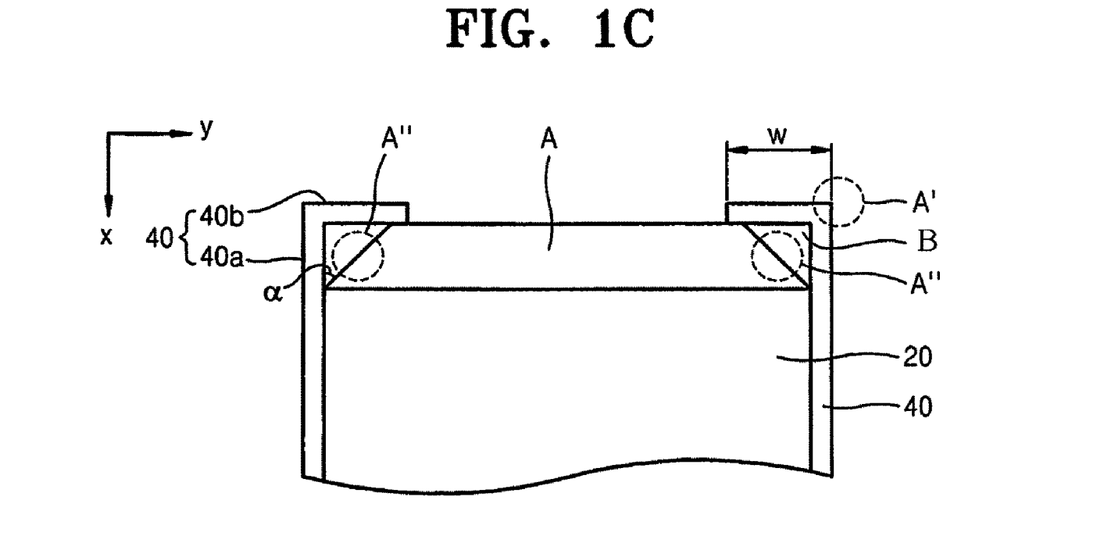
FIG. 1C illustrates a plan view of a part of the flat panel display apparatus of FIG. 1B.

Hereinafter, a flat panel display apparatus according to embodiments of the present invention will be explained in detail with reference to the accompanying drawings. FIG. 1A illustrates an exploded perspective view of a flat panel display apparatus according to an embodiment of the present invention. FIG. 1B illustrates an assembled perspective view of the flat panel display apparatus of FIG. 1A. FIG. 1C illustrates a plan view of a part of the flat panel display apparatus of FIG. 1B.

Referring to FIGS. 1A-1B, the flat panel display apparatus may include a flat display panel P and a bezel 40 surrounding at least one surface of the flat display panel P. The flat display panel P may have any suitable shape, and may include a first substrate 10, a second substrate 20 facing the first substrate 10, and a sealant 30 securing the first substrate 10 to the second substrate 20. A display unit 50 may be disposed between the first substrate 10 and the second substrate 20. The first and/or second substrates 10 and 20 may be formed of, e.g., a glass material or the like.

The bezel 40 may be positioned in parallel to the first substrate 10, and may include bent edges. For example, as illustrated in FIG. 1A, the bezel 40 may have a main panel parallel to the first substrate 10 and at least three side panels 40a, i.e., bent edges, along edges of the main panel. For example, as further illustrated in FIG. 1A, the bezel 40 may include three side panels 40a along three edges of the main panel and perpendicular thereto, and may include one partial side panel 40b along a fourth edge of the main panel. As illustrated in FIG. 1B, the flat display panel P may be positioned so the first substrate 10 may be on the main panel of the bezel 40, and side surfaces of the flat display panel P may be surrounded by the side panels 40a and partial side panel 40b of the bezel 40.

The partial side panel 40b of the bezel 40 may extend along a portion of an edge of the main panel, so a central portion of an edge of the first substrate 10, e.g., a central portion of the edge, may be exposed, as illustrated in FIGS. 1A-1B. For example, as illustrated in FIG. 1A, the partial side panel 40b may include two portions having a length W, so the two portions may be spaced apart from each other along the y-axis to expose the central portion of the edge, i.e., a central portion of a portion A of the first substrate 10 as will be discussed in more detail below. Accordingly, a portion of the flat display panel P may not be surrounded by the bezel 40. The bezel 40 may have any suitable shape, and may be formed of an elastic material, e.g., a metal. It is noted that if the bezel 40 is formed of an elastic material, the bezel 40 may return to its original state due to its elasticity after an external impact.

The first substrate 10 of the flat display panel P may be longer than the second substrate 20 along a first direction, e.g., along the x-axis, as illustrated in FIG. 1A. Accordingly, as further illustrated in FIG. 1A, the portion A of the first substrate 10, i.e., a portion of the first substrate 10 not overlapping the second substrate 20, may protrude beyond the second substrate 20 along the first direction, so an upper surface of the portion A may be exposed outside the second substrate 20. Corners of portion A may be chamfered, as illustrated in FIG. 1A.

More specifically, as illustrated in FIG. 1A, outer corners of the portion A, i.e., corners of the portions A facing away from the second substrate 20 to face a corner of the bezel 40, may be chamfered. For example, as illustrated in FIGS. 1B-1C, portions of outer corners of portion A may be removed, so portion A may include chamfered edges A". Accordingly, as illustrated in FIGS. 1B-1C, a bezel corner A' defined by side panels of the bezel 40 may be empty, so a space B may be formed between each chamfered edge A" and a respective bezel corner A', as illustrated in FIG. 1C.

Figure 2A:
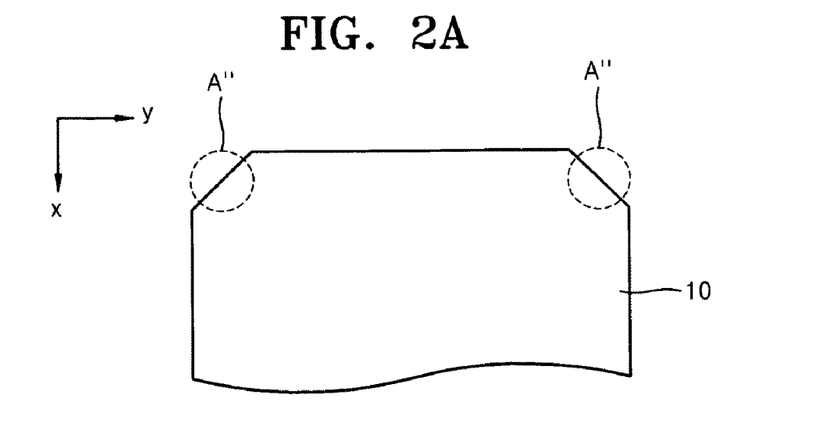
FIG. 2A illustrates a partial plan view of the first substrate in the flat panel display apparatus of FIG. 1C.

For example, each chamfered edge A" may extend from a corner of the second substrate 20 toward an outermost edge of the portion A, i.e., an edge of the portion A facing away from the second substrate 20. As illustrated in FIGS. 1C and 2A, the chamfered edge A" may be substantially planar, i.e., have a cross-section of a straight line in the xy-plane, and may extend at any suitable angle α with respect to the side panel 40a of the bezel 40. For example, as illustrated in FIG. 1C, angle α may be adjusted so a length W of the partial side panel 40b, i.e., a distance as measured along the y-axis, may completely overlap the space B to be in direct contact with a portion of the portion A.

Figure 2B:
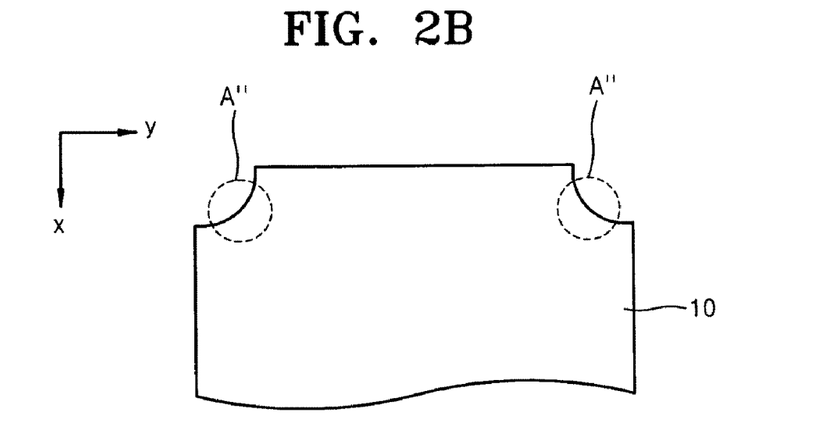
FIG. 2B illustrates a partial plan view of a first substrate in a flat panel display apparatus according to another embodiment of the present invention.
Figure 2C:
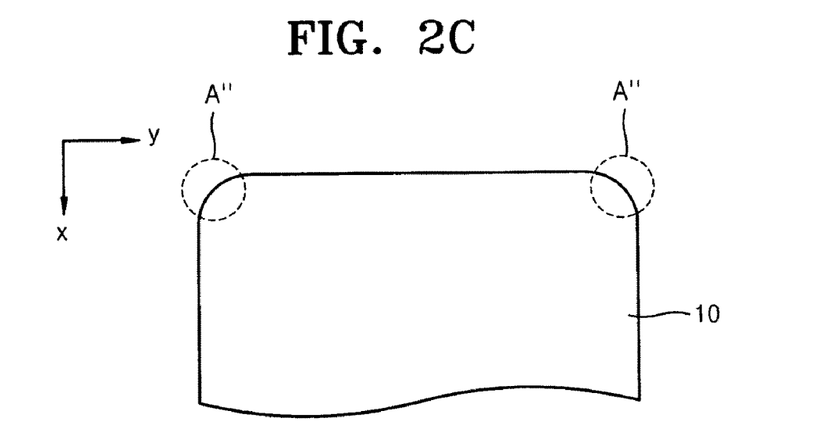
FIG. 2C illustrates a partial plan view of a first substrate in a flat panel display apparatus according to another embodiment of the present invention.

In other embodiments of the present invention, the chamfered edge A" may have any suitable shape. For example, as illustrated in FIG. 2B, the chamfered edge A" may be a curved surface, so a cross-section of the chamfered edge A" in the xy-plane may be a concave curve with respect to the first substrate 10. In another example, as illustrated in FIG. 2C, the chamfered edge A" may be a curved surface, so a cross-section of the chamfered edge A" in the xy-plane may be a convex curve with respect to the first substrate 10.

A flat panel display apparatus according to embodiments of the present invention may minimize damage to the flat display panel P upon external impact, e.g., when the flat panel display apparatus is dropped. In particular, external impact on the corners A' of the bezel 40 may be greater than on other portions of the bezel 40, e.g., a probability of increased damage to the corners A' of the bezel 40 upon hitting the ground may be higher than a probability of damage to flat portions of the bezel 40 upon hitting the ground. Accordingly, an impact on the corners A' of the bezel 40 resulting from the dropping of the flat panel display apparatus may bend the corners A' due to the impact. Since the corners of the first substrate 10 are chamfered, so the space B is defined between the bezel 40 and the first substrate 10, the first substrate 10 may not be affected by the bending of the corners A'. In other words, even though the corner A' of the bezel 40 may bend, e.g., inwardly, toward the first substrate 10, the space B may absorb the impact and the flat display panel P may not be affected since no portions thereof are positioned in close proximity to the bent corners A'.

Figure 4A:
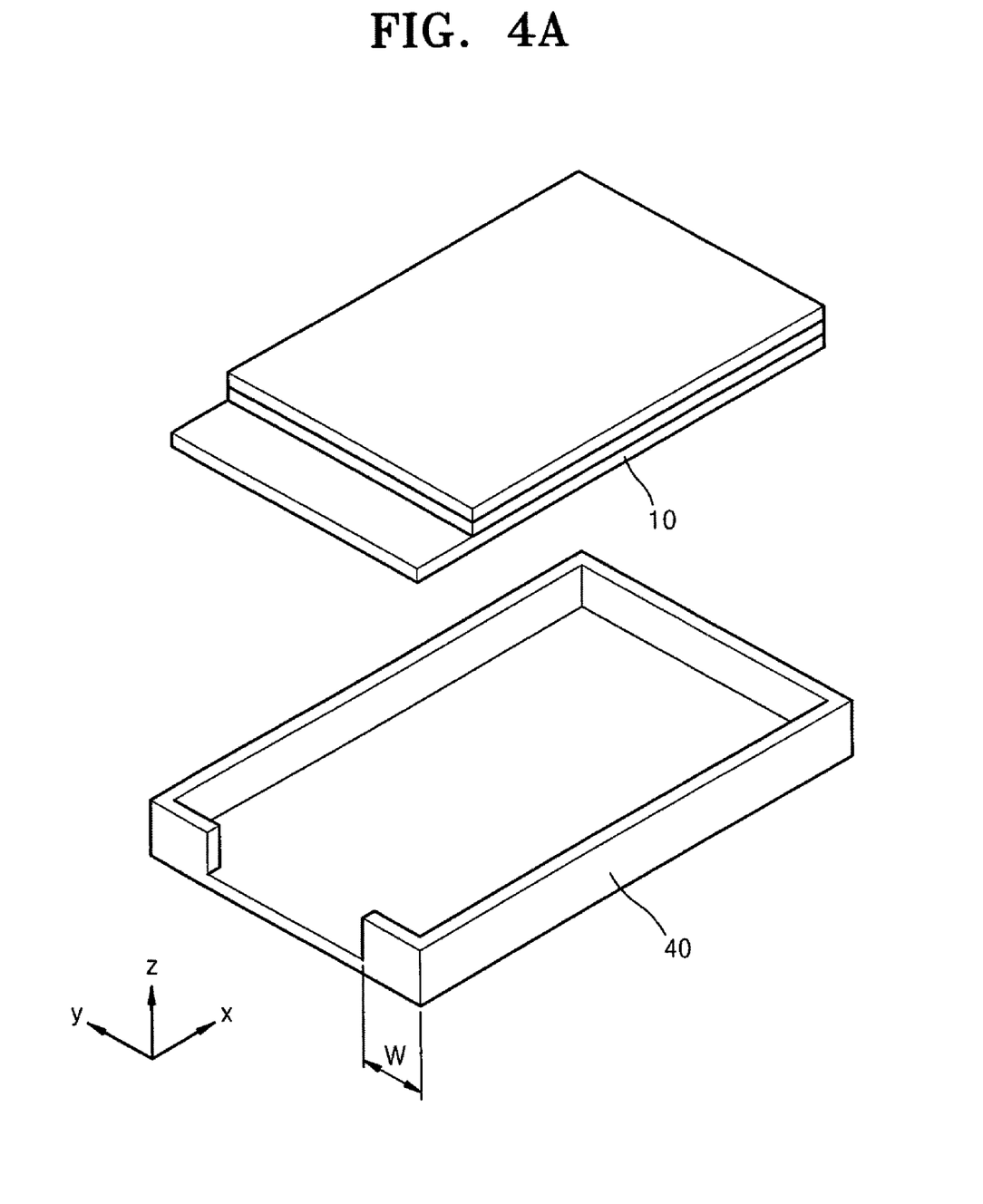
FIGS. 4A-4B illustrate exploded and assembled perspective views, respectively, of the comparative flat panel display panels in the Example.
Figure 4B:
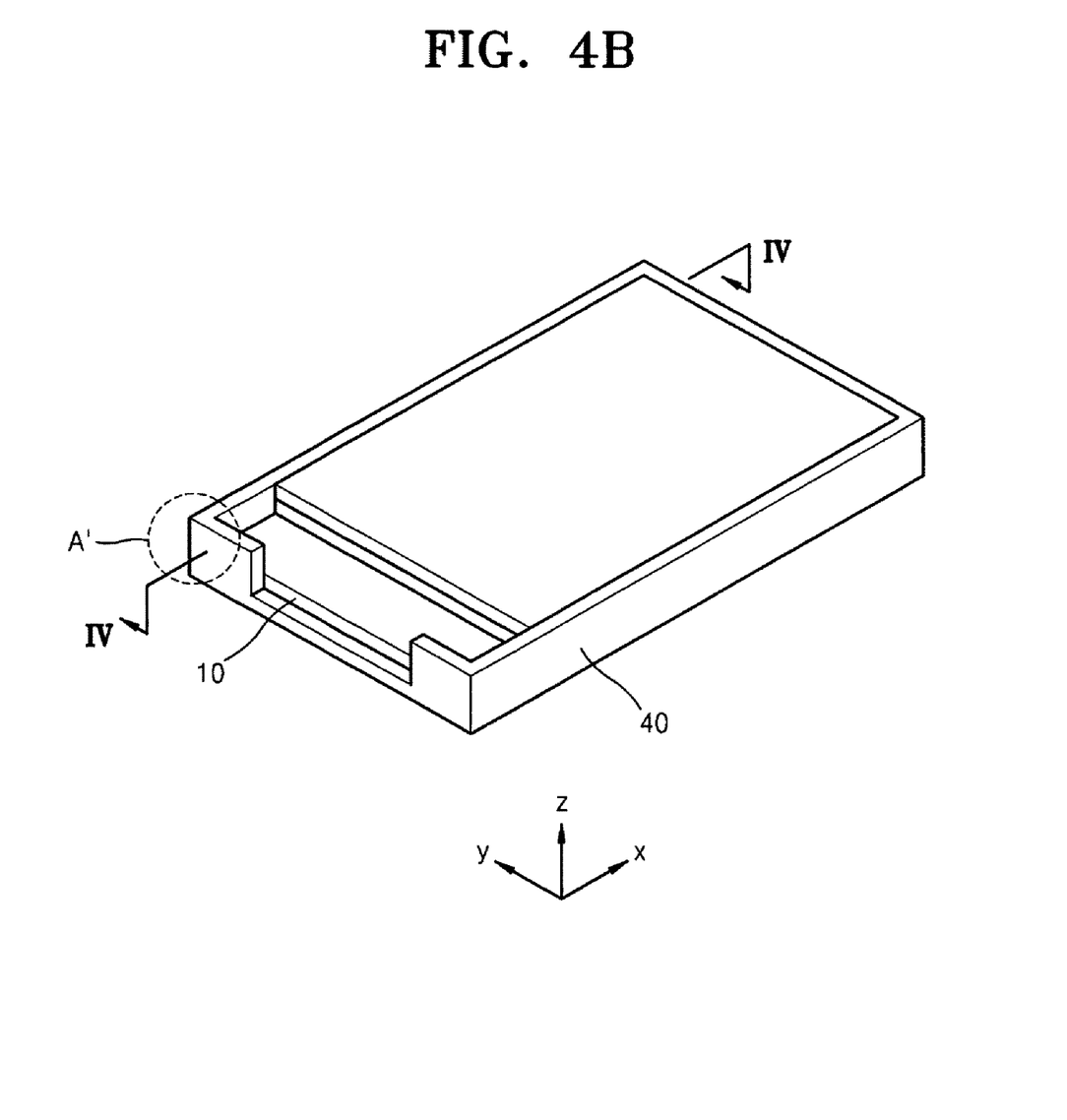
Figure 5A:
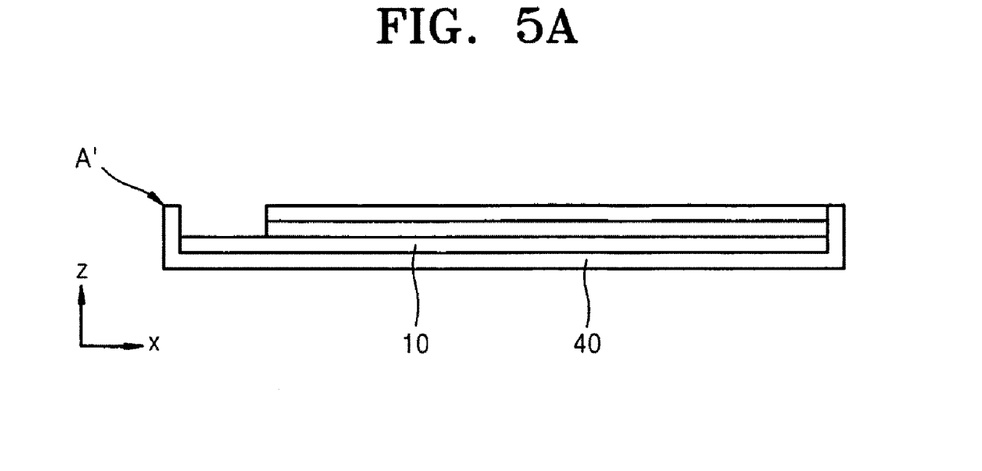
FIGS. 5A-5C illustrate schematic cross-sectional views along line IV-IV in FIG. 4B of damage caused to the comparative flat panel display panels in the Example.
Figure 5B:
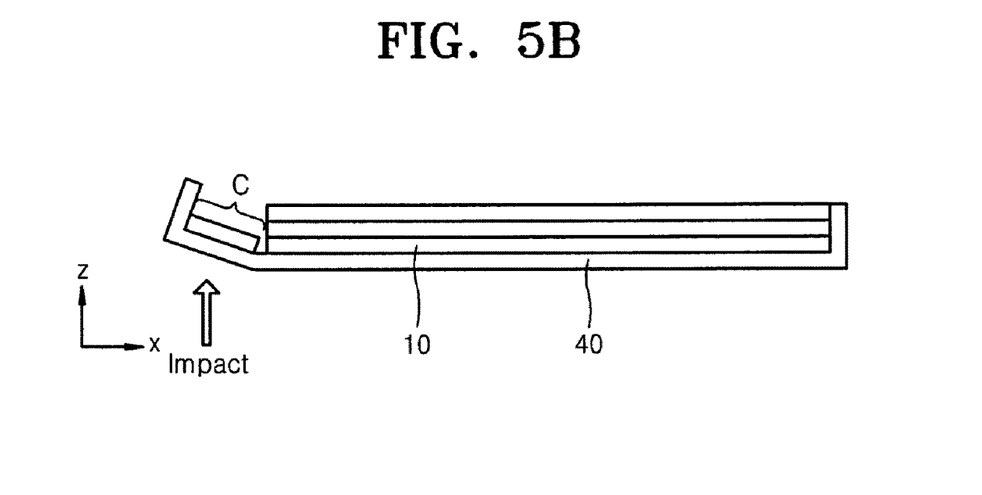
Figure 5C:
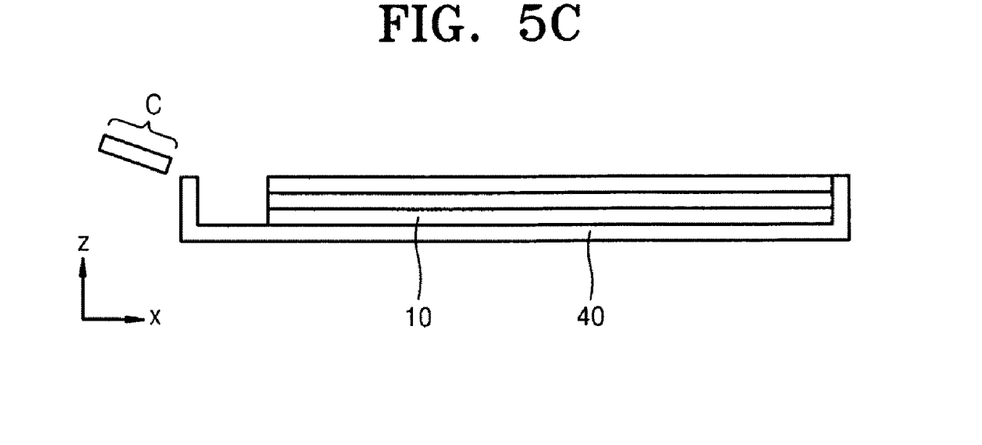

Further, since the chamfered edges A" of the portion A of the first substrate 10 of the flat panel display panel P are chamfered, propagation of the external impact from the corner A' to other portions of the flat display panel P may be prevented or substantially minimized. In contrast, if there were no spaces between corners of the first substrate 10 and the bezel 40, e.g., if portion A had a rectangular shape with right angles contacting the corners A' of the bezel 40 as illustrated in FIGS. 4A-4B and FIG. 5A, an external impact on the corners of the bezel could be absorbed by the first substrate 10, e.g., by the right-angled corners, and transmitted to other portions of the flat display panel to result in damage thereto, e.g., a corner A' could bend and break a portion C of the substrate 10 as illustrated in FIGS. 5B-5C. Accordingly, the chamfered edges A" of the portion A of the first substrate 10 according to embodiments of the present invention may substantially reduce damage to the flat display panel P.

Further, it is noted that although the bezel 40 may surround the first substrate 10, as illustrated in FIGS. 1A-1C, other configurations of the bezel 40 with respect to the flat display panel P are within the scope of the present invention, e.g., the bezel 40 may surround the second substrate 20. Accordingly, even if the bezel 40 surrounds the second substrate 20, since the chamfered edges A" of the portion A of the first substrate 10 are chamfered, damage to the flat display panel P due to an external impact, e.g., dropped, may be reduced.

In addition, since the flat display panel P includes the partial side panel 40b, attachment of the flat display panel P and the bezel 40 may be improved. For example, an element connected to the flat display panel P may extend through the partial side panel 40b of the bezel 40, e.g., through the space between the two portions of the partial side panel 40b corresponding to a central portion of the portion A of the first substrate 10. The element extending from the flat display panel P may be, e.g., a flexible printed circuit board 70 extending from a terminal unit 60 on the portion A outside the bezel 40. The terminal unit 60 may be electrically connected to the display unit 50.

Figure 3:
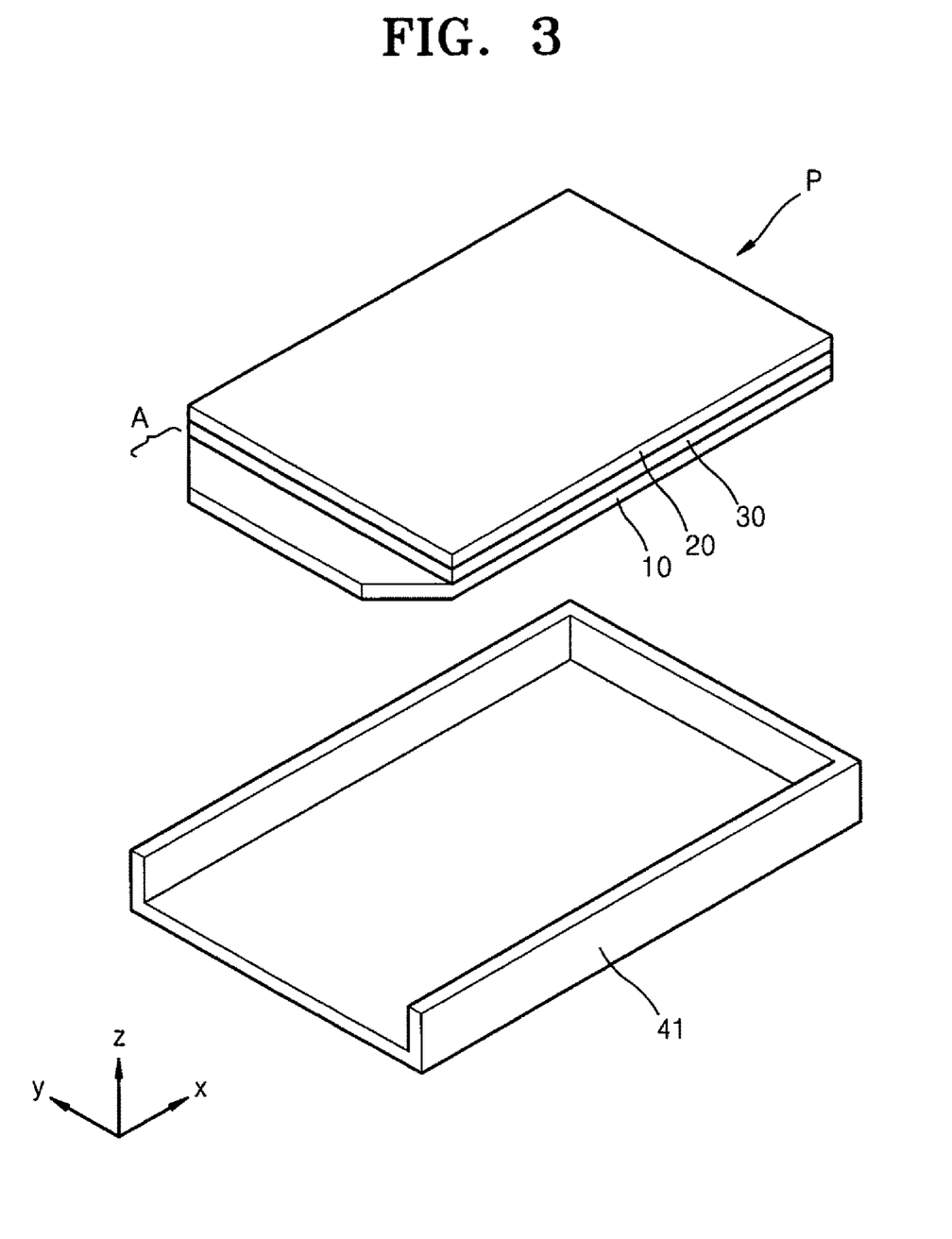
FIG. 3 illustrates an exploded perspective view of a flat panel display apparatus according to another embodiment of the present invention.

According to another embodiment of the present invention illustrated in FIG. 3, a flat panel display apparatus may be substantially similar to the flat panel display apparatus of FIGS. 1A-1C, with the exception of having a bezel 41 instead of the bezel 40. The bezel 41 may include a main panel and three side panels 40a to surround three edges of the flat display panel P. In other words, the bezel 41 may not include the partial side panel 40b, so one edge of the flat display panel P, e.g., an edge corresponding to the portion A of the first substrate 10, may not be surrounded by the bezel 41.

Example

Sixty (60) flat panel display apparatuses were manufactured according to an embodiment illustrated in FIGS. 1A-1C. Two hundred seventeen (217) comparative flat panel display apparatuses were manufactured via a substantially same process as the flat panel display apparatuses of FIGS. 1A-1C, with the exception of having rectangular first and second substrates, i.e., the comparative flat panel display apparatuses had no substrates with chamfered corners, as illustrated in FIGS. 4A-4B.

Each one of the flat panel display apparatuses was dropped eighteen (18) times, i.e., 3 cycles each consisting of six-time dropping, on a hard surface. Since each flat panel display apparatus is a hexahedron having six surfaces, one (1) cycle included dropping each flat panel display apparatus once on each of its six (6) surfaces. Accordingly, each flat panel display apparatus was dropped a total of six (6) times in each cycle, so three (3) cycles included a total of eighteen (18) droppings for each flat panel display apparatus.

After each dropping of each of the flat panel display apparatuses, a flat panel display panel of the flat panel display apparatus was inspected to determine whether it was damaged. Once the surface was determined as not damaged, a point was awarded to the flat panel display apparatus. Accordingly, each flat panel display apparatus could be awarded points in a range from 0 to 18 in three (3) cycles, a lower number of points indicating higher damage upon contact with the hard surface.

For example, one point was awarded when a flat panel display apparatus was dropped on its bottom surface and the flat display panel thereof was not damaged, one point was awarded when the flat panel display apparatus was dropped on its top surface and the flat display panel thereof was not damaged, and one point was awarded when the flat panel display apparatus was dropped on its left surface and the flat display panel thereof was not damaged. Accordingly, if the flat display panel was not damaged when the flat panel display apparatus was dropped on either of the bottom or top surfaces thereof, but was damaged when the flat panel display apparatus was dropped on the left surface thereof, the flat panel display apparatus was awarded two points out of potential three points. Similarly, if the flat panel display apparatus was dropped six times and its flat display panel was not damaged, the flat panel display apparatus was awarded a total of six points.

Figure 7:
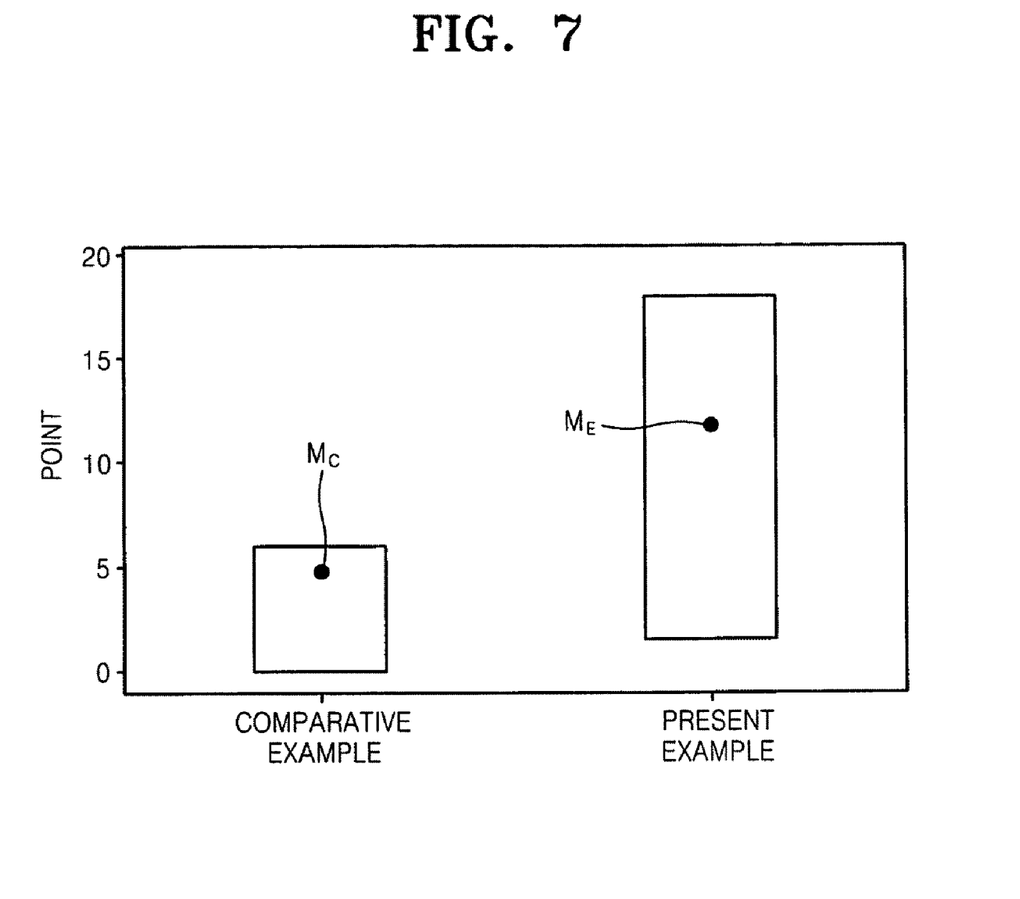
FIG. 7 illustrates a graph of damage to flat panel display apparatuses according to embodiments of the present invention as compared to damage to comparative flat panel display apparatuses.

A sum of total points for the sixty (60) flat panel display apparatuses manufactured according to the embodiment illustrated in FIGS. 1A-1C was averaged and compared to an averaged sum of total points for the two hundred seventeen (217) comparative flat panel display apparatuses, i.e., apparatuses of FIGS. 4A-4B. Results are illustrated in a graph in FIG. 7. Referring to FIG. 7, an average number of points for the comparative flat panel display apparatuses, i.e., apparatuses of FIGS. 4A-4B, was indicated by $M_C$, and an average number of points for the flat panel display apparatuses according to FIGS. 1A-1C was indicated by $M_E$.

Figure 6A:
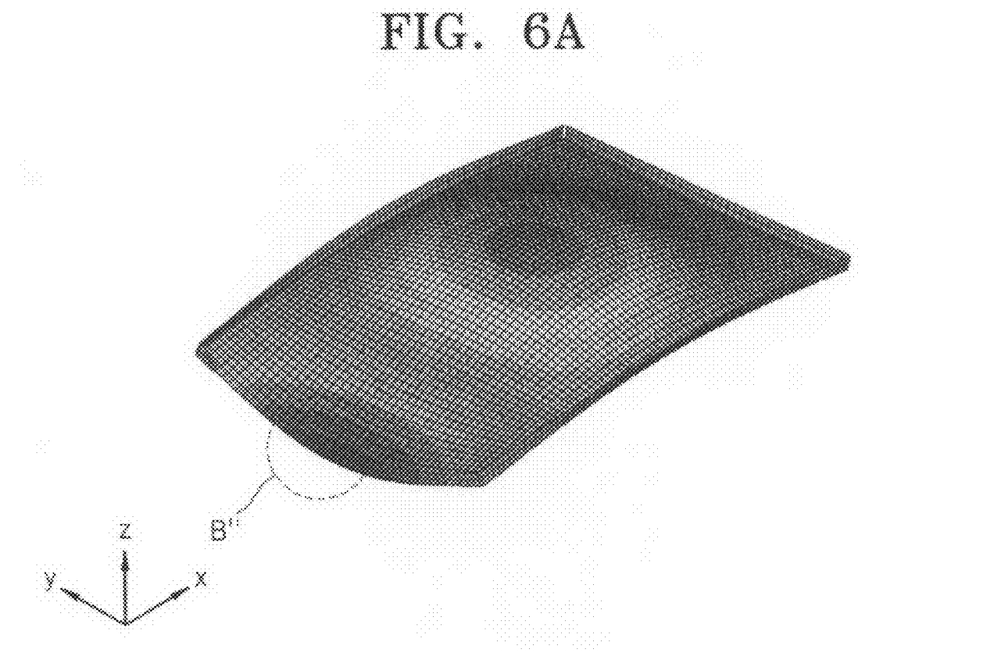
FIGS. 6A-6B illustrate simulated perspective views of damage caused to the comparative flat panel display panels in the Example.
Figure 6B:
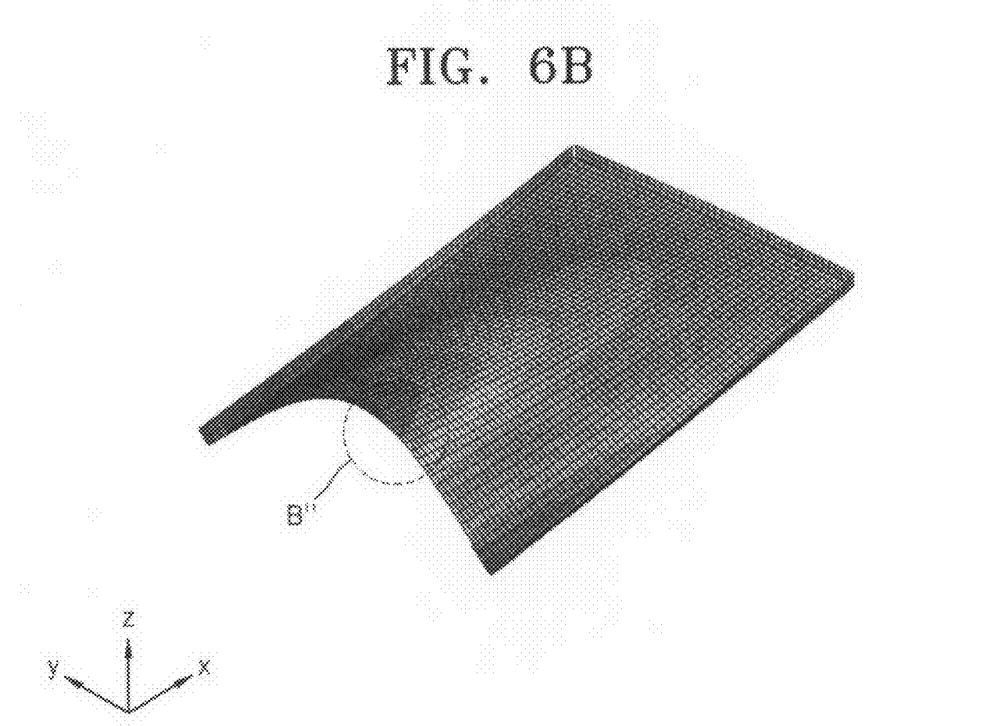

As illustrated in FIG. 7, $M_C$ was calculated as 4.78 points and $M_E$ was calculated as 11.80 points. Accordingly, the flat panel display apparatuses according to embodiments of the present invention exhibited a substantially lower damage probability, e.g., damage due to dropping, than the comparative flat panel display apparatuses. Damage to the comparative flat panel display apparatuses is illustrated in FIGS. 5B-5C and FIGS. 6A-6B. For example, impact on a corner A' of a bezel 40 of a comparative flat panel display may bend the corner A', so a portion C of a substrate in contact with the corner A' may bend, as illustrated in FIG. 5B, thereby breaking the portion C of the substrate 10, as illustrated in FIG. 5C. In another example, impact on a corner of a bezel of a comparative flat panel display apparatus was transmitted to a central portion thereof, such that an edge B" of a substrate having no chamfered corners was bent inwardly or outwardly, as illustrated in FIGS. 6A-6B, thereby damaging the edge B".

As described above, the flat panel display apparatus according to embodiments of the present invention may reduce damage resulting from dropping or the like. Since the corners of the first substrate of the flat display panel exposed outside the second substrate are chamfered, although the corners of the bezel are bent and then return to their original states, an impact on the flat display panel may be substantially reduced as compared with a flat panel display apparatus having no chamfered corners.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A flat panel display apparatus, comprising:
   a flat display panel, the flat panel including,
      first and second substrates facing each other and coupled by a sealant, the first substrate extending beyond the second substrate, a portion of the first substrate extending beyond the second substrate defining a protruding portion, an outermost edge of the protruding portion defining a protruding edge of the first substrate, and corners of the protruding portion being chamfered from boundaries between the first substrate and the sealant, and a display unit between the first and second substrates; and a bezel surrounding the flat display panel, wherein:

the bezel includes a main panel, three side panels and one partial side panel, the main panel being parallel to and covering an entire surface of the first substrate, the three side panels and one partial side panel extending from the main panel and being along edges of the first substrate, the partial side panel extending along the protruding edge of the protruding portion and the three side panels extending along three edges of the first substrate other than the protruding edge of the first substrate, and the partial side panel being perpendicular to two of the three side panels, a space is defined between each chamfered corner of the protruding portion and a respective corner of the bezel, the respective corner of the bezel being defined by one side panel and a portion of the partial side panel, with respect to each respective corner of the bezel that is defined by one side panel and a portion of the partial side panel, the portion of the partial side panel completely overlaps the space defined between the chamfered corner and the respective corner of the bezel and partially overlaps the protruding edge of the first substrate such that the protruding edge of the first substrate is in direct contact with the partial side panel, and side surfaces of the chamfered corners are not in contact with the bezel.

2. The flat panel display apparatus as claimed in claim 1, further comprising a terminal unit on the protruding portion of the first substrate, the terminal unit being electrically connected to the display unit.

3. The flat panel display apparatus as claimed in claim 2, further comprising a flexible printed circuit board electrically connected to the terminal unit.

4. The flat panel display apparatus as claimed in claim 1, wherein the bezel includes an elastic material.

5. The flat panel display apparatus as claimed in claim 4, wherein the elastic material includes metal.

6. The flat panel display apparatus as claimed in claim 1, wherein the chamfered corners of the protruding portion are substantially planar.

7. The flat panel display apparatus as claimed in claim 1, wherein the chamfered corners are curved.

8. The flat panel display apparatus as claimed in claim 7, wherein the chamfered corners of the protruding portion are convex.

9. The flat panel display apparatus as claimed in claim 7, wherein the chamfered corners of the protruding portion are concave.

* * * * *